(12) United States Patent
Gioioso et al.

(10) Patent No.: US 11,728,149 B2
(45) Date of Patent: Aug. 15, 2023

(54) METHODS, MEDIUMS, AND SYSTEMS FOR SELECTING VALUES FOR PARAMETERS WHEN TUNING A MASS SPECTROMETRY APPARATUS

(71) Applicant: Waters Technologies Ireland Limited, Dublin (IE)

(72) Inventors: Marisa Gioioso, Hopkinton, MA (US); Akshay Kurmi, Milford, MA (US)

(73) Assignee: WATERS TECHNOLOGIES IRELAND LIMITED, Dublin (IE)

( * ) Notice: Subject to any disclaimer, the term of this patent is extended or adjusted under 35 U.S.C. 154(b) by 0 days.

(21) Appl. No.: 17/446,088

(22) Filed: Aug. 26, 2021

(65) Prior Publication Data
US 2022/0084802 A1    Mar. 17, 2022

Related U.S. Application Data

(60) Provisional application No. 63/161,092, filed on Mar. 15, 2021, provisional application No. 63/070,582, filed on Aug. 26, 2020.

(51) Int. Cl.
*H01J 49/36* (2006.01)
*H01J 49/00* (2006.01)
*G01N 30/72* (2006.01)

(52) U.S. Cl.
CPC ...... *H01J 49/0036* (2013.01); *G01N 30/7233* (2013.01); *H01J 49/0031* (2013.01); *H01J 49/0045* (2013.01)

(58) Field of Classification Search
CPC ............ H01J 49/0036; H01J 49/0031; H01J 49/0045; G01N 30/7233
USPC ................................................ 250/281, 282
See application file for complete search history.

(56) References Cited

U.S. PATENT DOCUMENTS

| | | | |
|---|---|---|---|
| 2008/0201095 A1 | 8/2008 | Yip et al. | |
| 2008/0203293 A1* | 8/2008 | Makarov | H01J 49/425 250/283 |
| 2014/0264068 A1 | 9/2014 | Brucker et al. | |

FOREIGN PATENT DOCUMENTS

| | | | |
|---|---|---|---|
| EP | 3041027 A1 | 7/2016 | |
| WO | WO-2021024396 A1 * | 2/2021 | |

OTHER PUBLICATIONS

Wong, et al ("Application of Artificial Intelligence to Triple Quadrupole Mass Spectrometry (TQMS)" IEEE Transactions on Nuclear Science, vol. 31, No. 1, Feb. 1, 1984, pp. 804-810, XP055861461 (Year: 1984).*

(Continued)

*Primary Examiner* — Michael Maskell
(74) *Attorney, Agent, or Firm* — Goodwin Procter LLP

(57) ABSTRACT

Exemplary embodiments provide methods, mediums, and systems for automatically tuning a mass spectrometry (MS) apparatus. The MS apparatus may include a number of parts, each of which may be associated with adjustable parameters that affect a performance of the part. An artificial intelligence may determine values for the parameters that are predicted to reduce data variability when performing an experiment with the MS apparatus. By reducing data variability, experiments run with the MS apparatus are more likely to be repeatable on different devices, in different labs, by different operators, and at different times.

18 Claims, 9 Drawing Sheets

(56) References Cited

OTHER PUBLICATIONS

International Search Report and Written Opinion for International Patent Application No. PCT/IB2021/057841, dated Nov. 23, 2021.
Beavis, R. C., et al., "Artificial Intelligence and Expert Systems in Mass Spectrometry: Applications, Theory and nstrumentation" Encyclopedia of Analytical Chemistry, p. 1-40, Oct. 30, 2000.
International Preliminary Report on Patentability for International Patent Application No. PCT/IB2021/057841, dated Mar. 9, 2023.

* cited by examiner

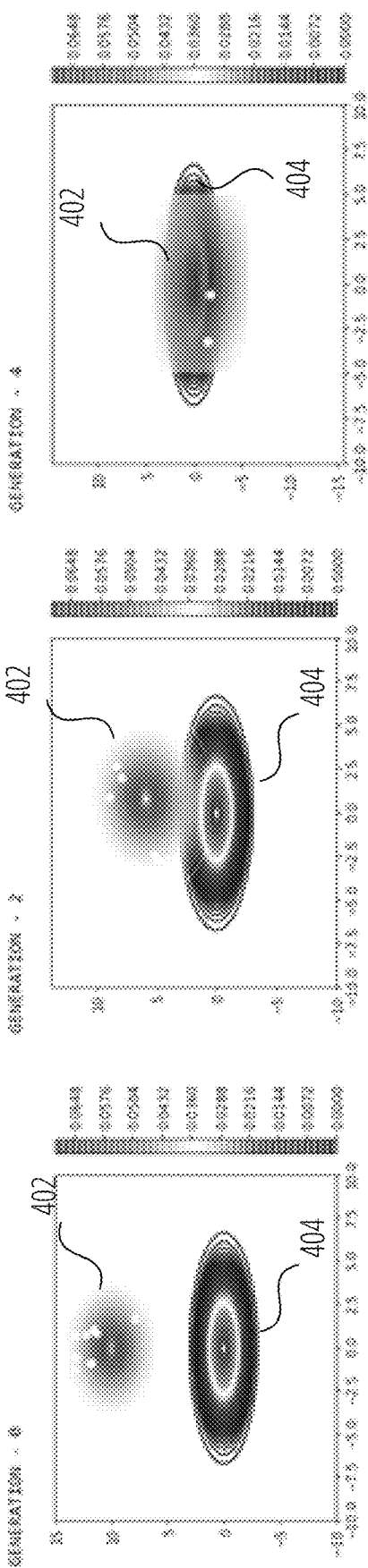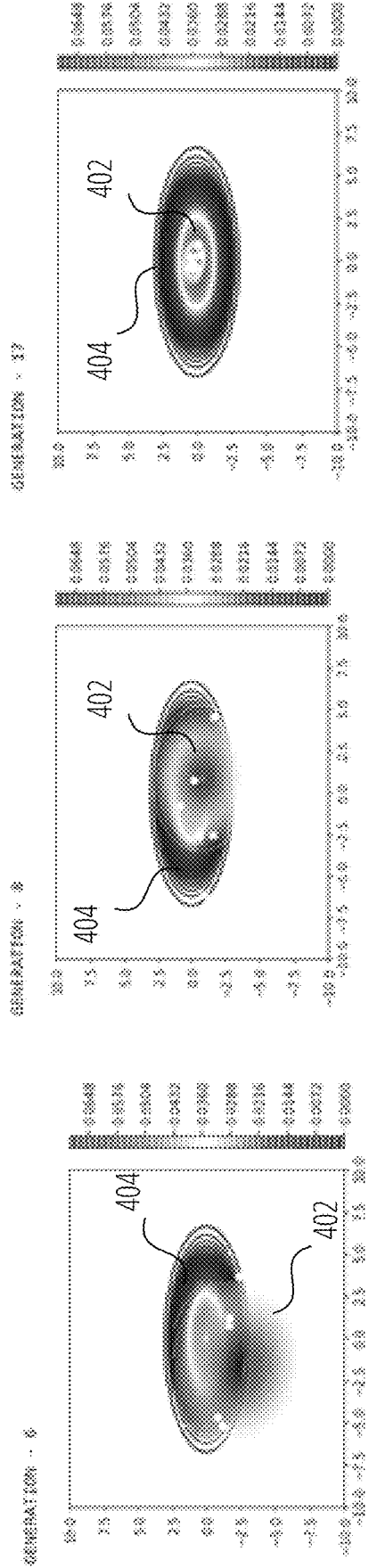
FIG. 4A  FIG. 4B  FIG. 4C
FIG. 4D  FIG. 4E  FIG. 4F

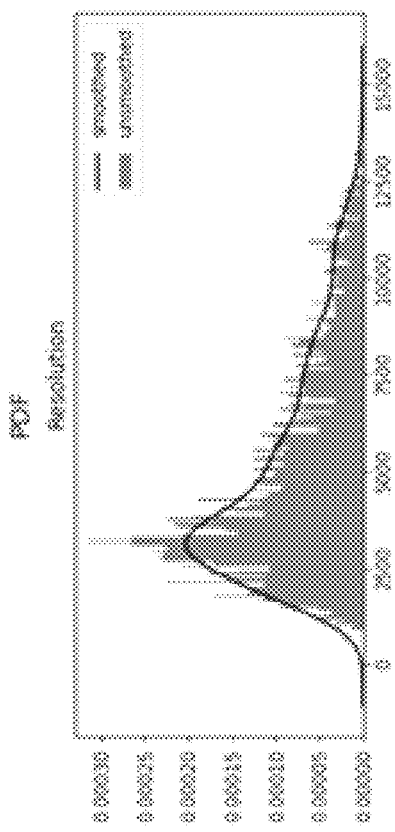
FIG. 5A
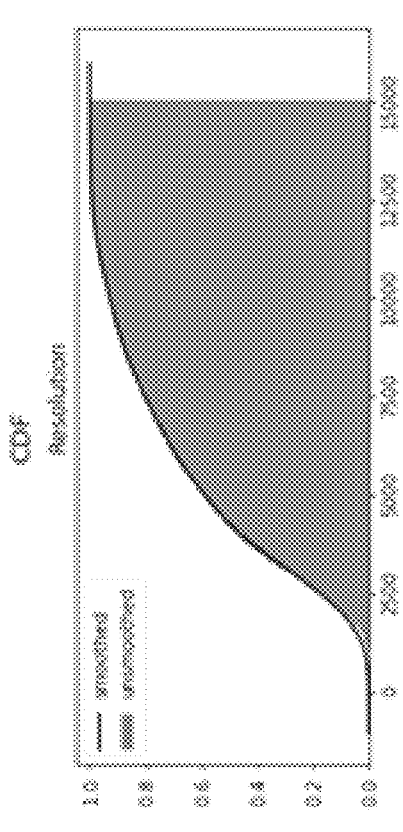
FIG. 5B
FIG. 5C
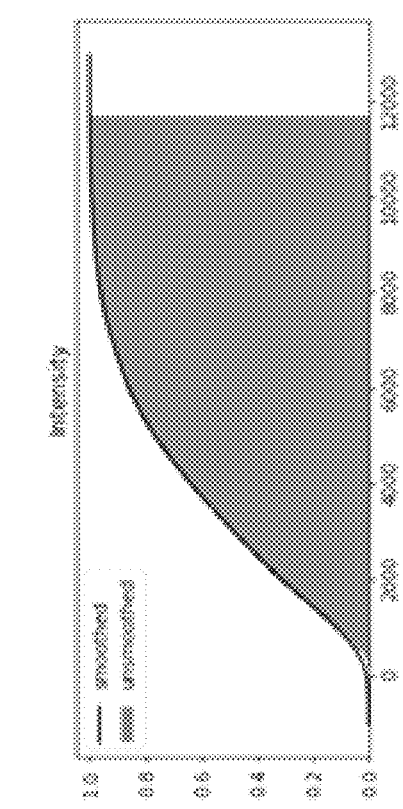
FIG. 5D

METHODS, MEDIUMS, AND SYSTEMS FOR SELECTING VALUES FOR PARAMETERS WHEN TUNING A MASS SPECTROMETRY APPARATUS

CROSS-REFERENCE TO RELATED APPLICATIONS

This application claims the benefit of U.S. Provisional Application No. 63/161,092, filed Mar. 15, 2021 and U.S. Provisional Application No. 63/070,582, filed Aug. 26, 2020, entitled "METHODS, MEDIUMS, AND SYSTEMS FOR SELECTING VALUES FOR PARAMETERS WHEN TUNING A MASS SPECTROMETRY APPARATUS", the entire disclosures of which are hereby incorporated by reference.

BACKGROUND

Mass spectrometry (MS) and liquid chromatography-mass spectrometry (LCMS) apparatuses are used to analyze a chemical sample to study the identity, mass, or structure of the sample. It is very desirable for analyses of the same sample to yield the same results, even tests are performed in different labs, by different operators, on different machines, and/or at different times.

However, MS devices are highly complex instruments made up of many different parts. Each part may be adjusted to affect the performance of the instrument. Because of the sheer number of variables that can be adjusted, and the interdependency of these variables, it is extremely difficult for non-experts to successfully tune an instrument. For example, adjustments may be interdependent, such that adjustments to one part should be made in conjunction with corresponding adjustments to another part. Moreover, there is no objective "best" setting for any given part, because poor intensity or resolution can be affected by the part's age, cleanliness, or even temperature. Still further, as a machine becomes more accurate, it requires even more precise tuning. Thus, tuning an MS instrument can be a highly subjective process that is typically carried out by experts.

Because it is so difficult to tune MS instruments, experts capable of making these adjustments are in high demand. And because tuning is something of an art form, different experts may tune the same MS instrument in different ways. Consequently, the tuning process is a major source of data variability.

BRIEF SUMMARY

According to a first embodiment, a tuning system may access a set of parameters. Each parameter may be associated with a part of a mass spectrometry (MS) apparatus and may control an operation of the part during a data gathering process. The set of parameters may collectively form a search space.

The search space may be searched using an artificial intelligence (AI) configured to select a set of values for the parameters that are predicted to reduce data variability during the data gathering process. Data variability may refer to the tendency of an experiment to yield different outputs given the same input. Data variability may arise when the inputs are tested under different environmental conditions, or when an experimental apparatus exhibits different properties over time.

The values for the parameters selected by the AI may be transmitted to the MS apparatus. After the MS apparatus applies the values and analyzes a reference material, the tuning system may receive the results of the analysis. Based on the results, the tuning system may determine if the selected values did, in fact, reduce data variability and, based on this determination, may update a model applied by the artificial intelligence to select the set of values for the parameters.

Because the AI is configured specifically to search for a combination of parameters that reduces data variability (rather than, for example, optimizing the performance of the MS apparatus overall or with respect to a particular sample), a user of the MS apparatus can be confident that experiments will be repeatable across different operators, labs, instruments, and times. For example, if the MS apparatus is set up to determine if a sample includes a marker for a given disease or condition, it is important that the results of the analysis do not depend on which machine was used to run the analysis or which operator was running the machine. Preferably, the only variability in the analysis should come from the samples being analyzed. In other words, the same sample analyzed on two different machines, at two different times, by two different operators should nonetheless yield the same spectra. Otherwise, it may be difficult to determine whether two different results arose because one sample had the disease marker and the other did not, or because different machines were used to analyze the samples.

In other embodiments, the AI may be configured to search for parameters that optimize for intensity, resolution, stability, or some other goal.

According to a second embodiment, the artificial intelligence may be configured to select the values for the parameters based on one or more of reproducibility of the results, or stability of the results of running the MS apparatus. An improved reproducibility may be indicated when a same sample is analyzed to yield substantially similar results across different times, instruments, labs, or operators. Stability of the results may be indicated when a relatively small change to the set of parameters does not substantially reduce a quality of the results; because the experimental apparatus will have a tendency to vary slightly from experiment-to-experiment, improving stability means that the results will be less likely to change significantly through these natural fluctuations. These two indicators (reproducibility and stability) provide direct ways to measure data variability.

According to a third embodiment, the artificial intelligence may be configured to select the values for the parameters based on one or more of a data resolution, a data intensity, or a peak shape in data from the MS apparatus. Resolution refers to how finely resolved a peak in the data is. When peaks are not finely resolved, it is unclear if a given peak in the data is naturally quite wide, or if the peak is made up of multiple overlapping peaks. Intensity refers to how high a peak is. A greater intensity indicates a strong signal from the MS apparatus (and thus a lower signal-to-noise ratio). Peak shape refers to the degree to which a peak is symmetrical, rather than having a tail in one direction. Because the area under the peak will be integrated to identify the quantity of the substance associated with the peak, peaks with long tails can be problematic because they are more likely to overlap other peaks (thus skewing the measurement of the underlying substances). The present inventors have identified that these indicators provide indirect ways to measure whether data is more reproducible and less variable.

According to a fourth embodiment, the artificial intelligence may be configured to select values for the parameters that are predicted to yield improved results across different samples. Thus, the MS apparatus may be tuned for general use, and there is less worry that the apparatus will be tuned to achieve particularly good results on a specific sample while achieving worse results on other samples. Because MS apparatuses may be used to analyze many samples over a long stretch of time, tuning for general performance regardless of the sample being analyzed may allow the device to be tuned less often, providing more uptime during which samples can be tested.

According to a fifth embodiment, the artificial intelligence may be configured to select values for the parameters based on a particular sample to be analyzed by the MS apparatus. Especially when the AI applies heuristics to allow the search space to be searched efficiently, it may be possible to tune the machine on a sample-by-sample basis relatively quickly. This has the advantage of yielding better overall performance with the tradeoff of spending more time on tuning (thus having less uptime for sample analysis). In general, the AI may be configured to strike a user-specified balance between reproducibility of results, performance, and speed.

According to a sixth embodiment, the artificial intelligence may be configured to define a probability distribution for each parameter and to sample values for the parameters based on the probability distribution. The probability distribution may describe a range of values for a respective parameter and a likelihood that a selected value optimizes the data variability. Using a probability distribution in this way provides several advantages. For instance, the probability distribution allows expert knowledge to be injected into the system in the form of priors that describe the current understanding of which parameters affect data variability based on experimental data, modeling, research, and expert opinion. This allows the search space to be searched more efficiently. Moreover, by adjusting the standard deviation of the probability distribution when sampling during the search, the search can be directed more widely (over a greater range of possible parameter values) or more narrowly (over a limited range more focused on the solutions most likely to yield the best results). Thus, the system can adjust between exploring the search space to identify potentially unexpected results, and exploiting targeted areas of the search space that have been identified as the best contenders for a solution.

According to a seventh embodiment, the tuning system may define and apply a sample generation model or heuristic, such as a covariance matrix, configured to limit the search space based on relationships between the parameters. The model/heuristic may define limits, formulas, relationships, etc. that link one parameter with another. For example, if it is known that a certain variable cannot take on a value that is more than twice the value of another variable, the model/heuristic may tie these two parameters together so that one cannot be adjusted without keeping the other in the acceptable range. This allows certain portions of the search space to be eliminated from consideration because selecting parameter configurations in those areas would violate the constraints set out in the model/heuristic, thus allowing the search to be performed more quickly and efficiently.

According to an eighth embodiment, the MS apparatus may be one of a plurality of MS apparatuses, and the MS apparatuses' parameters may be tuned as a group. Particularly when it is known that several devices will be used to measure a set of samples (e.g., when a given lab uses multiple devices), tuning the devices as a group allows data variability to be reduced among the entire group, rather than on a machine-by-machine basis. This process may exploit adjustments that might not have been made to a single machine (e.g., because one machine is more constrained than others in the group). Accordingly, the reproducibility of the results across the group of devices may be improved.

For example, according to a ninth embodiment, a first MS apparatus from among the plurality of MS apparatuses may outperform the rest of the plurality of MS apparatuses. Tuning the first MS apparatus individually to reduce its variability might entail parameter settings that result in a fairly high performance. However, when tuning the first MS apparatus as part of a group, the parameters for the first MS apparatus may be selected to reduce a performance of the first MS apparatus, so that the data variability of the overall group is reduced.

According to a tenth embodiment, the AI may apply an evolutionary algorithm configured to define a first generation of parameter configurations, define a reproduction technique among the parameter configurations, define a mutation technique among the parameter configurations, and apply the reproduction technique and the mutation technique to create a second generation of parameter configurations. Evolutionary algorithms, such as genetic algorithms, are particularly well suited to the problem tuning an instrument to reduce data variability because the mutations selected can be controlled throughout the process to vary between search space exploration and exploitation stages, thus efficiently searching a complex search space with possible interdependencies among the parameters.

For example, according to an eleventh embodiment, the reproduction technique may involve determining two or more of the parameters that are related to each other, and swapping the related parameters as a group. This is an efficient way to represent the relatively complex analysis captured by the model/heuristic.

According to a twelfth embodiment, determining the first generation of parameter configurations may be performed using one or more priors. This allows expert knowledge to be integrated into the system, carrying advantages similar to the sixth embodiment described above.

Nonetheless, evolutionary algorithms are not the only types of AI that are well-adapted to this particular problem. For example, according to a thirteenth embodiment, other suitable techniques include Markov decision processes, Bayesian optimization, and/or reinforcement learning.

According to a fourteenth embodiment, the tuning system may present a user interface configured to display which parameter configurations have been determined to reduce data variability and/or a relationship between two or more of the parameters. This allows the AI's understanding of the problem, as captured for example in the probability distributions and model/heuristic, to be shared with users of the device (thus teaching them how to better tune the MS apparatus themselves). This also allows the user to see which tradeoffs are being made in terms of data variability, performance, and time, and potentially adjust the tuning process to balance these factors as desired.

Any of the above embodiments may be implemented as instructions stored on a non-transitory computer-readable storage medium and/or embodied as an apparatus with a memory and a processor configured to perform the actions described above.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4A-FIG. 4F illustrates a generate-adapt paradigm for a covariance matrix adaption algorithm in accordance with one embodiment.

FIG. 5A illustrates an experimental probability density function (PDF) of an intensity generated by a grid search in accordance with one embodiment.

FIG. 5B illustrates an experimental probability density function (PDF) of a resolution generated by a grid search in accordance with one embodiment.

FIG. 5C illustrates an experimental cumulative distribution function (CDF) of an intensity generated by a grid search in accordance with one embodiment.

FIG. 5D illustrates an experimental cumulative distribution function (CDF) of a resolution generated by a grid search in accordance with one embodiment.

DETAILED DESCRIPTION

Exemplary embodiments described herein provide techniques for programmatically tuning a mass spectrometry (MS) apparatus with an artificial intelligence specifically configured to reduce data variability during a data gathering process. Other embodiments may tune for other goals, such as instrument performance, intensity, resolution, stability, etc.

Figure 1:
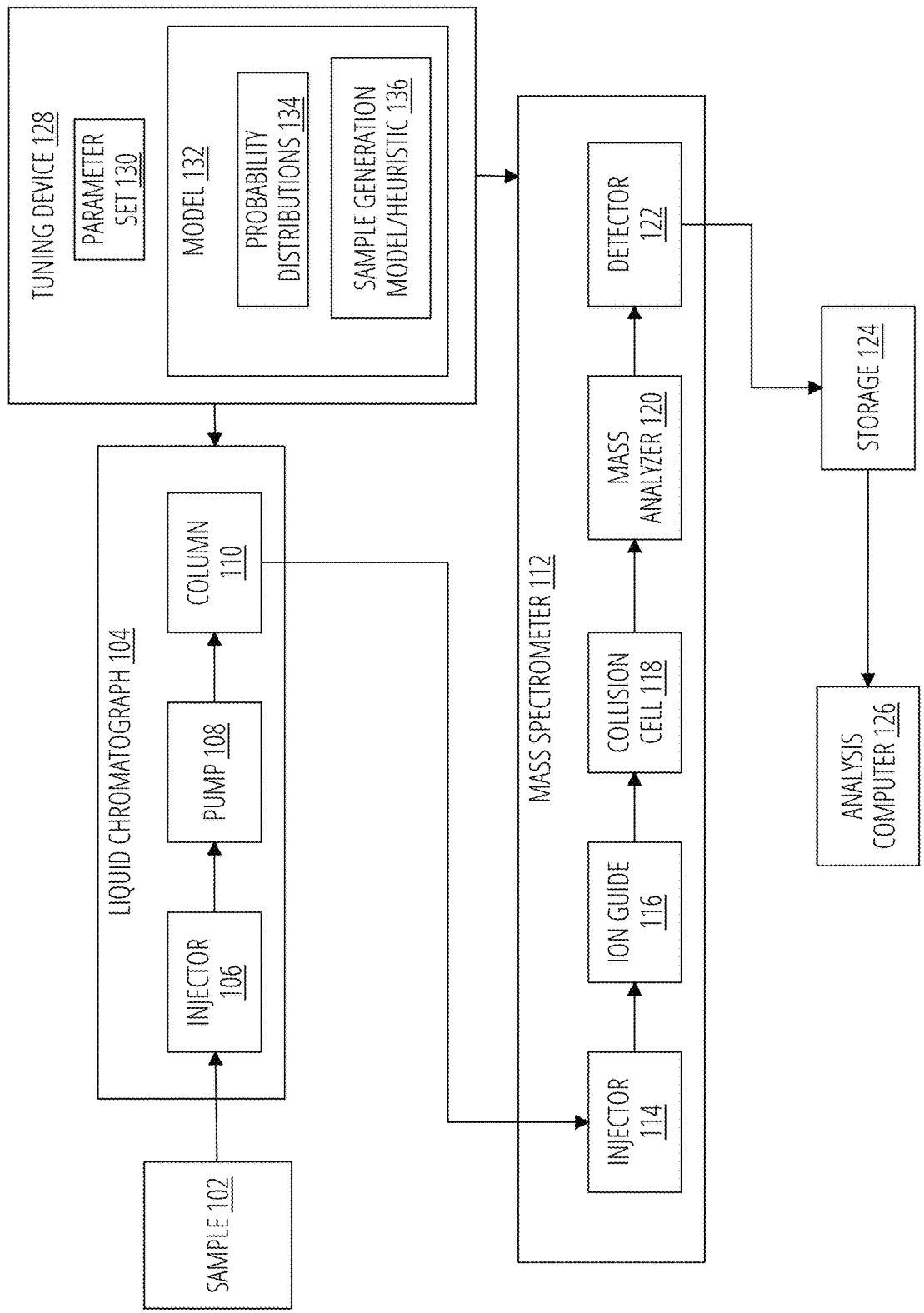
FIG. 1 illustrates an example of a mass spectrometry system according to an exemplary embodiment.

For purposes of illustration, FIG. 1 is a schematic diagram of a system that may be used in connection with techniques herein. Although FIG. 1 depicts particular types of devices in a specific LCMS configuration, one of ordinary skill in the art will understand that different types of devices (e.g., MS, tandem MS, etc.) may also be used in connection with the present disclosure. It is also noted that, when the present disclosure refers to tuning an "MS apparatus," any part of the system used in conjunction with the mass spectrometer 112 (such as the liquid chromatograph 104) may be encompassed by this term.

A sample 102 is injected into a liquid chromatograph 104 through an injector 106. A pump 108 pumps the sample through a column 110 to separate the mixture into component parts according to retention time through the column.

The output from the column is input to a mass spectrometer 112 for analysis. Initially, the sample is dissolved and ionized by a desolvation/ionization device 114. Desolvation can be any technique for desolvation, including, for example, a heater, a gas, a heater in combination with a gas or other desolvation technique. Ionization can be by any ionization techniques, including for example, electrospray ionization (ESI), atmospheric pressure chemical ionization (APCI), matrix assisted laser desorption (MALDI) or other ionization technique. Ions resulting from the ionization are fed to a collision cell 118 by a voltage gradient being applied to an ion guide 116. Collision cell 118 can be used to pass the ions (low-energy) or to fragment the ions (high-energy).

Different techniques (including one described in U.S. Pat. No. 6,717,130, to Bateman et al., which is incorporated by reference herein) may be used in which an alternating voltage can be applied across the collision cell 118 to cause fragmentation. Spectra are collected for the precursors at low-energy (no collisions) and fragments at high-energy (results of collisions).

The output of collision cell 118 is input to a mass analyzer 120. Mass analyzer 120 can be any mass analyzer, including quadrupole, time-of-flight (TOF), ion trap, magnetic sector mass analyzers as well as combinations thereof. A detector 122 detects ions emanating from mass analyzer 122. Detector 122 can be integral with mass analyzer 120. For example, in the case of a TOF mass analyzer, detector 122 can be a microchannel plate detector that counts intensity of ions, i.e., counts numbers of ions impinging it.

A storage 124 may provide permanent storage for storing the ion counts for analysis. For example, storage 124 can be an internal or external computer data storage device such as a disk, flash-based storage, and the like. An analysis computer 126 analyzes the stored data. Data can also be analyzed in real time without requiring storage in a storage medium 124. In real time analysis, detector 122 passes data to be analyzed directly to computer 126 without first storing it to permanent storage.

Collision cell 118 performs fragmentation of the precursor ions. Fragmentation can be used to determine the primary sequence of a peptide and subsequently lead to the identity of the originating protein. Collision cell 118 includes a gas such as helium, argon, nitrogen, air, or methane. When a charged precursor interacts with gas atoms, the resulting collisions can fragment the precursor by breaking it up into resulting fragment ions. Such fragmentation can be accomplished as using techniques described in Bateman by switching the voltage in a collision cell between a low voltage state (e.g., low energy, <5 V) which obtains MS spectra of the peptide precursor, with a high voltage state (e.g., high or elevated energy, >15V) which obtains MS spectra of the collisionally induced fragments of the precursors. High and low voltage may be referred to as high and low energy, since a high or low voltage respectively is used to impart kinetic energy to an ion.

Various protocols can be used to determine when and how to switch the voltage for such an MS/MS acquisition. For example, conventional methods trigger the voltage in either a targeted or data dependent mode (data-dependent analysis, DDA). These methods also include a coupled, gas-phase isolation (or pre-selection) of the targeted precursor. The low-energy spectra are obtained and examined by the software in real-time. When a desired mass reaches a specified intensity value in the low-energy spectrum, the voltage in the collision cell is switched to the high-energy state. The high-energy spectra are then obtained for the pre-selected precursor ion. These spectra contain fragments of the precursor peptide seen at low energy. After sufficient high-energy spectra are collected, the data acquisition reverts to low-energy in a continued search for precursor masses of suitable intensities for high-energy collisional analysis.

Different suitable methods may be used with a system as described herein to obtain ion information such as for precursor and product ions in connection with mass spectrometry for an analyzed sample. Although conventional switching techniques can be employed, embodiments may also use techniques described in Bateman which may be characterized as a fragmentation protocol in which the voltage is switched in a simple alternating cycle. This switching is done at a high enough frequency so that multiple high- and multiple low-energy spectra are contained within a single chromatographic peak. Unlike conventional switching protocols, the cycle is independent of the content of the data. Such switching techniques described in Bateman, provide for effectively simultaneous mass analysis of both precursor and product ions. In Bateman, using a high- and low-energy switching protocol may be applied as part of an LC/MS analysis of a single injection of a peptide mixture. In data acquired from the single injection or experimental run, the low-energy spectra contains ions primarily from unfragmented precursors, while the high-energy spectra contain ions primarily from fragmented precursors. For example, a portion of a precursor ion may be fragmented to form product ions, and the precursor and product ions are substantially simultaneously analyzed, either at the same time or, for example, in rapid succession through application of rapidly switching or alternating voltage to a collision cell of an MS module between a low voltage (e.g., generate primarily precursors) and a high or elevated voltage (e.g. generate primarily fragments) to regulate fragmentation. Operation of the MS in accordance with the foregoing techniques of Bateman by rapid succession of alternating between high (or elevated) and low energy may also be referred to herein as the Bateman technique and the high-low protocol.

In summary, such as when operating the system using the Bateman technique, a sample 102 is injected into the LC/MS system. The LC/MS system produces two sets of spectra, a set of low-energy spectra and a set of high-energy spectra. The set of low-energy spectra contain primarily ions associated with precursors. The set of high-energy spectra contain primarily ions associated with fragments. These spectra are stored in a storage medium 124. After data acquisition, these spectra can be extracted from the storage medium and displayed and processed by post-acquisition algorithms in the analysis computer 126.

The data acquired by the high-low protocol allows for the accurate determination of the retention times, mass-to-charge ratios, and intensities of all ions collected in both low- and high-energy modes. In general, different ions are seen in the two different modes, and the spectra acquired in each mode may then be further analyzed separately or in combination.

The ions from a common precursor as seen in one or both modes will share the same retention times (and thus have substantially the same scan times) and peak shapes. The high-low protocol allows the meaningful comparison of different characteristics of the ions within a single mode and between modes. This comparison can then be used to group ions seen in both low-energy and high-energy spectra.

As can be seen above, an MS system may be made up of many parts. Each of those parts may be adjustable by changing parameters associated with the part. For example, in a mass reflectron MS apparatus a metal grid is generally placed within an ion mirror. It may be possible to adjust the position of the grid, which may affect the performance of the MS apparatus. Other examples of adjustable parameters include, but are not limited to, the MS apparatus' sampling cone, ion acceleration, ion focus, entrance lens values, pusher offset, aperture, puller, ion energy, pusher, and tube lens values.

In order to tune these parts, a tuning device 128 may be employed. The tuning device 128 may access a parameter set 130 describing the parameters of the MS apparatus that are available to be adjusted. The tuning device 128 may select values for these parameters by deploying a model 132, as described in more detail below. The model 132 may take many forms.

In one embodiment, the model 132 includes one or more probability distributions 134 representing a probability that data variability will be reduced when a given parameter associated with a selected probability distribution takes on a certain value. The probability distributions 134 may be represented as a best-fit equation, a series of data points, a graph, or another suitable representation. The probability distributions 134 may be determined experimentally or based on expert knowledge, based on modeling, or some other suitable technique.

The model 132 may also include a covariance matrix 136 or other sample generation model or heuristic that may be used to capture relationships between parameters. Whether a covariance matrix or other type of model/heuristic is used, this model/heuristic may generate a new generation of individuals according to some model or heuristic. In the case of the CMA, there may be both a "generate" step and an "adapt" step, where the covariance matrix itself is updated to reflect the success the algorithm is having with the last generation. In a genetic algorithm, the adapt step may be simply the process of eliminating individuals that are low performers so that the high performers can be recombined In some cases, parameters benefit from being adjusted together as a group, or the value of parameter may constrain the value of other parameters. These relationships may be captured as equations, formulas, limits, constraints, or other representations in the model/heruistic 136. In the covariance matrix adaptation algorithm described below, the relationships may be captured as a matrix. The model/heuristic 136 may be a data structure that maps a value or range of values for a constraining parameter (e.g., stored in a first row or column of the covariance matrix 136) to a value or range of values for one or more constrained parameters (e.g., stored in a second, third, etc. row or column of the model/heuristic 136). The model/heuristic may be associated with a covariance that describes a strength of the relationship between the constraining and constrained parameters.

According to one embodiment, the model 132 may be trained by or may represent an artificial intelligence. For instance, the model 132 may be trained using an evolutionary algorithm such as a genetic algorithm, a Markov decision process, Bayesian learning, or reinforcement learning.

Figure 2:
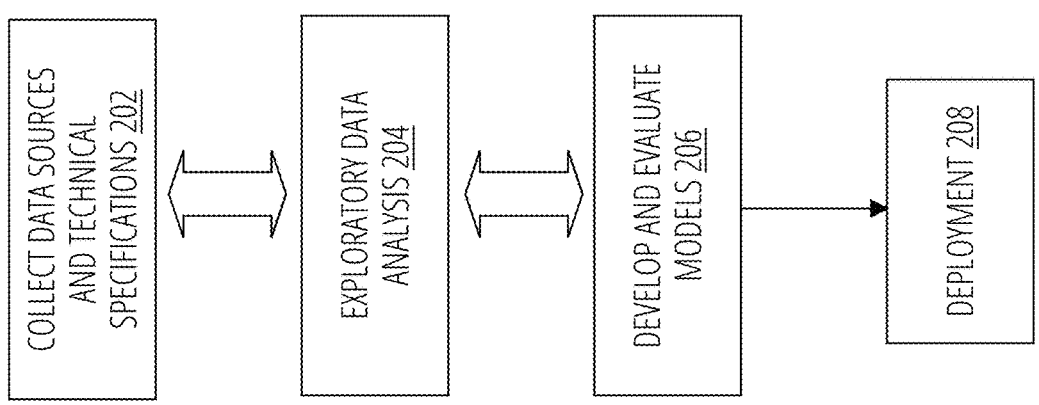
FIG. 2 illustrates an exemplary pre-deployment procedure in accordance with one embodiment.
Figure 7:
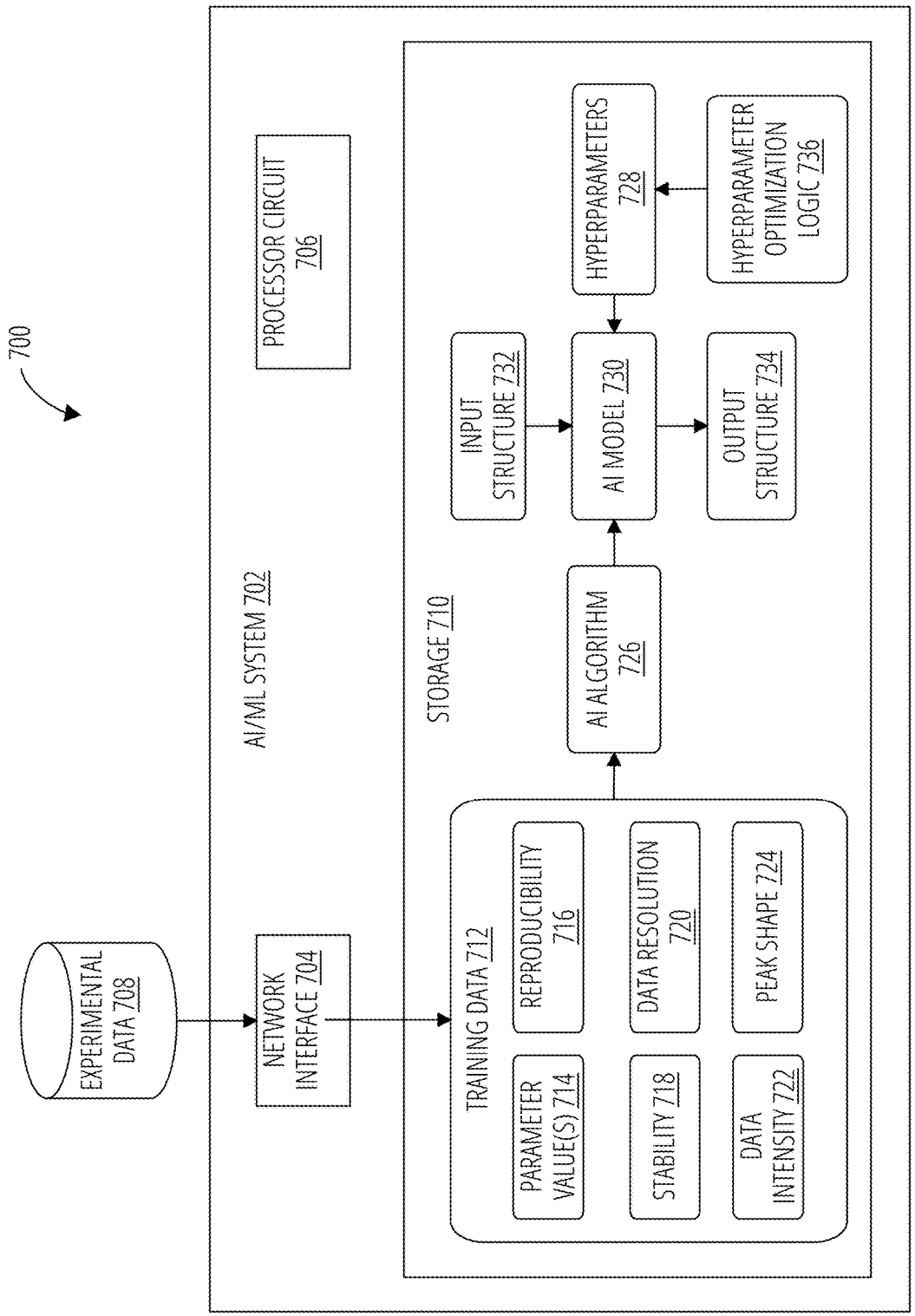
FIG. 7 illustrates an exemplary artificial intelligence/machine learning (AI/ML) system suitable for use with exemplary embodiments.

Tuning the parameters may be accomplished using the exemplary tuning procedure described below with respect to FIG. 7. The tuning procedure shown in FIG. 7 is an example of active learning, where the training happens in real time. Other embodiments, however, may apply techniques such as supervised learning in order to generate a model that can later be applied to incoming data. In such offline algorithms, before the procedure is operationally deployed on an experimental device, it may be helpful to incorporate a pre-deployment procedure such as the one shown in FIG. 2.

At block 202, a tuning system may collect data sources and technical specifications. The data sources may include experimental data from databases, simulated data generated based on computer-based models, experimental results from academic research, etc. The experimental data may include an identification of an input provided to an MS apparatus and the output generated by the MS apparatus. Optionally, the data sources may specify a configuration of the MS apparatus that gave rise to the output. In addition to the parameter settings, other information about the apparatuses may be provided, including details about the operating environment (e.g., temperature, humidity), the age of the devices, the operational history of the devices (e.g., whether the devices have been consistently used to sample dirty materials or in dirty environments), etc. The technical specifications may include details on the parts of various MS apparatuses and the adjustable parameters that can be changed to affect a performance of the part.

At block 204, the tuning system may conduct an exploratory data analysis to determine relationships between settings for the parameters of the MS apparatus and the outputs generated by the MS apparatus. For example, the system may examine the results generated by two different apparatuses that are similar to each other, and identify any differences in the configurations of the apparatuses. Based on this information, the system may determine that the parameters that differ between the configurations are not probably significant contributors to data variability (at least, in the ranges used in the configurations). On the other hand, if the same sample was analyzed in two different experiments but different results were generated, the system may conclude that the device configurations did contribute to data variability.

It is not necessary that the system compares the results generated in two different contexts in order to evaluate data variability. The tendency toward data variability can also be detected indirectly using measurements such as peak resolution or intensity, the signal-to-noise ratio in the results, peak shape, fragmentation efficiency and other measures.

At block 206, the tuning system may use the understanding developed in block 204 to develop and evaluate models correlating the parameter settings to data variability. For instance, based on the outputs generated by the MS apparatus as specified in the data sources and/or the technical specifications, the tuning system may compute probability distributions and/or covariance matrices as described above.

Tuning the instrument parameters to reduce data variability may be done directly, or may be a result of tuning different instruments to achieve a target value instead of simply tuning them to achieve the best possible values. For instance, if it is anticipated that an instrument's signal will deteriorate over a period of time (e.g., several months) from when it was new, the instrument may be tuned to a target that will most likely be the maximum it can achieve at the end of that period of time. In this way, the instrument will produce consistent results over the time period, even as the instrument's parts age.

Moreover, the target can be selected based on the maximum performance achievable by the poorest-performing instrument in a group of instruments. As the tuning procedure is performed on each of the instruments of the group with this target in mind, the group of instruments are able to perform more consistently with each other.

Block 202, block 204, and block 206 may be repeated in a feedback loop. For example, if the exploratory data analysis at block 204 is inconclusive (e.g., it is unable to learn relationships between the parameters and the outputs of the MS apparatus with more than a predefined level of confidence), processing may revert back to block 202 to identify additional data sources. If a reasonable model cannot be developed at block 206, then processing may revert to block 204 for further analysis of the data.

After a reasonable model is developed at block 206, the model may be deployed for use with an MS apparatus. As noted above, other embodiments employing active or online learning may not need to make use of a previously defined model. For example, the tuning device 128 may use the model to tune the MS apparatus before (or while) an experiment is carried out by the MS apparatus.

Figure 3:
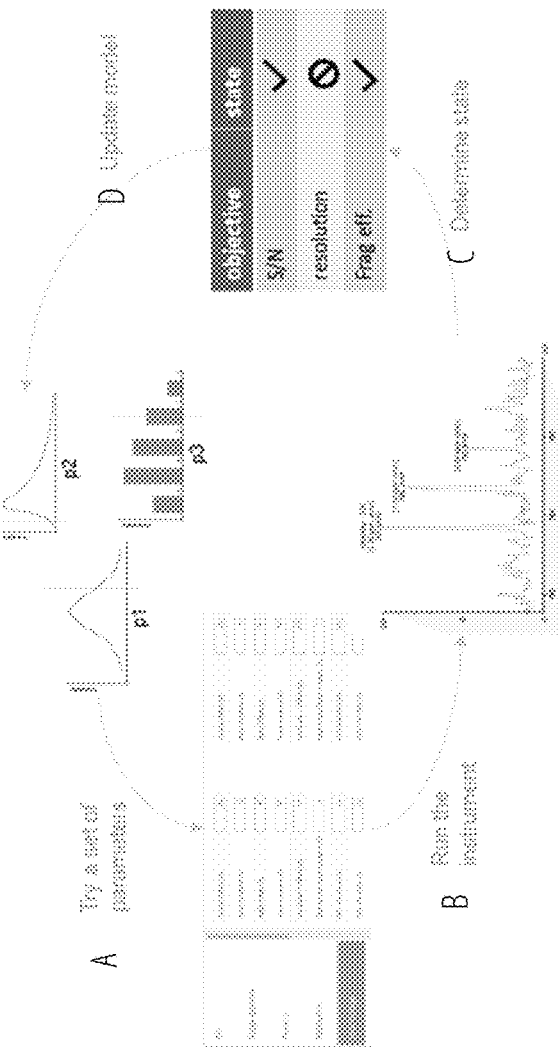
FIG. 3 illustrates an exemplary tuning procedure in accordance with one embodiment.

After a model is developed in the pre-deployment procedure, it can be used to tune an MS apparatus. FIG. 3 provides a high-level overview of an exemplary tuning procedure in accordance with one embodiment. This procedure is described in more detail in connection with FIG. 8 and FIG. 9.

The sum total of the available parameter settings for the MS apparatus (e.g., all the possible configurations for the apparatus) may collectively form a search space. This space may be searched to find a configuration predicted to result in minimal (or at least low) data variability. To this end, at (A) the system may access the above-described probability distributions and select a parameter set for consideration. In selecting the parameters, the system may constrain the available options based on the model/heuristic. For example, the system may identify a first parameter most likely to influence the data variability and select a value for that parameter. The system may then apply the model/heuristic to modify the parameter in accordance with any constraints reflected in the model/heuristic; this effectively eliminates some configurations from the search space (or reduces the probability that the area of the search space corresponding to those configurations will be searched). The system may then proceed to a second parameter that is next-most likely to reduce data variability, and select a value for that parameter. The system may repeat this process of selecting values and determining how the remaining parameters are constrained until values have been selected for all parameters; alternatively, multiple parameters may be modified at the same time.

Next, at (B), the tuning system may use the selected values for the parameters to tune the MS apparatus. The tuning system may tune the MS apparatus directly, by instructing the MS apparatus to change values for the parameters, or indirectly by generating a configuration specification and transmitting the specification to another device or to a user that configures the MS apparatus. The MS apparatus may then be run with the identified settings to generate experimental results. For instance, a known calibrant or source material may be injected into the MS apparatus to generate experimental data, and the experimental data may be compared to known information about the calibrant or source material.

At (C), the tuning system may receive an output of the MS apparatus that are indicative of results of the analysis (e.g., a spectrograph). These results may be compared against predefined criteria indicative of data variability (e.g., the above-identified measurements including signal-to-noise ratio, fragmentation efficiency, peak shape, intensity, resolution, reproducibility of results, stability of results, etc.). Based on whether and the degree to which the results meet or fail to meet these criteria, the system may adjust the model at (D) (e.g., by modifying the probability distributions and/or the model/heuristic) in a manner similar to the one described above at block 206.

One example of an evolutionary algorithm that has proven to be successful with exemplary embodiments is the covariance matrix adaptation (CMA) algorithm. An example of applying this algorithm to the techniques described herein is next detailed with reference to FIG. 4A-FIG. 7 (deleted).

CMA is in the class of evolutionary algorithms. Because it is stochastic in nature and uses generations of individual candidate solutions, it learns how to adapt to find new better candidates, in this case settings of the MS apparatus. As compared to other evolutionary algorithms such as particle swarm optimization (PSO), CMA may converge to optimal settings more reliably and more quickly because of its learning paradigm—CMA generates new candidate solutions, but also adapts its hyperparameters, which influences how it searches the search space at each generation.

In this embodiment, a covariance matrix defines a multi-dimensional Gaussian distribution. When Gaussians are defined in multiple dimensions (i.e. one dimension per instrument setting that is being tuned), in addition to a multi-dimensional mean and variance, there are off-diagonal covariance terms that define how one setting is correlated with another. When the off-diagonal terms are close to 0, the distribution is an ellipse aligned along the axes in two dimensions when looking down the z-axis. When there is correlation among the settings, the off-diagonal terms are non-zero, and the distribution becomes skewed. This Gaussian defines a sampling distribution, that the next generation of candidates is drawn from.

CMA follows a two-step generate-adapt paradigm. The generate step is the process of sampling the next generation of points from this distribution. The adapt step is the process of learning from the previous generation. Based on the evaluated points, a vector is generated pointing in the direction of favorable function value. Then the Gaussian is both moved in the direction of that vector and its covariance structure is updated. If the fitness value changes by a large value, then the covariance grows. If it changes by a small value, the covariance shrinks. When the algorithm starts to converge on an optimum, the vector moving the mean and covariance defining its degree of exploration converge to 0.

An example of this generate-adapt paradigm is depicted in FIG. 4A-FIG. 4F. For the disk 404 representing the objective function, the covariance matrix defines a Gaussian sampling distribution 402. Each generation the parameters of the distribution are updated, in mean (moving downward) and in covariance (expanding, then contracting).

In optimization problems, besides having the basic algorithm in place, the approach is generally defined by the definition of the objective function, the processing of the data for use in the objective function, the choice of settings to operate on, and construction of prior information related to those settings.

First, as is a problem with many optimizations, the objective function can be fairly complicated to define and costly to execute. One difficulty with the application described herein is that the objective function is performed on data generated live from an MS instrument; in some cases, this may include a common standard such as leucine enkephalin (leu enk) infused in it. From this point of view, the infusion of a real compound through a real MS instrument should be a part of the objective function.

One objective is therefore to maximize the resolution, sensitivity, and peak shape of the standard (e.g., leu enk) peak. This may be done by optimizing three parameters that tune the time of flight portion of the mass spectrometer—the reflectron grid voltage, steering voltage, and pusher offset voltage. In one embodiment, these three settings may be accessible programmatically through an internal message passing interface. Through this programmatic interface, once the CMA algorithm generates the new candidate setting values they can be sent to the instrument.

Following this, a very short period of time is allowed for the instrument to settle with the new voltages, and then mass spectra generated by the instrument are received. Because the electrospray source on the instrument has some variability, the signal varies from one scan to the next. To overcome this variability, a predetermined number (e.g., 5) scans may be collected and averaged together. The standard peak is then isolated on the aggregate scan and the resolution, integral of the peak intensity, and a measure of its tail weight are calculated. The resolution is calculated as the mass divided by the full width at half maximum of the peak, or M/FWHM, and the integrated intensity is the integral of the peak's ion counts. In order to determine the tail weights, the peak data is regressed onto a Pearson IV function using the Nelder Mead optimization algorithm. The resulting parameters for shape and asymmetry can be used to integrate the tails to determine their weight, and this is minimized to get the optimal peak shape.

In this example, there are 3 objectives-two are maximizations and one is a minimization. Their units are different and the order of magnitude of each is different, so in order to develop a single objective combining all three, a normalization and aggregation step is performed. Multiple approaches can be used. For example, one can define a minimum, $x_{min}$, and maximum, $x_{max}$, for each of our objectives and then normalize based Equation 1:

$$\frac{x - x_{min}}{x_{max} - x_{min}} \qquad \text{Equation 1}$$

to get each objective in the range [0,1]. One possible limitation of this approach is that the minimum and maximum values vary per instrument, and even for the same instrument over time. In these cases, actual values might fall out of the bounds specified. A simple remedy is to force the final value to the boundaries if they are out of bounds. But if this happens to multiple settings evaluated for fitness, then the scores will be equal for those settings, and the algorithm may not learn.

Instead, one could pick very large bounds so that the values could never fall outside them. But in resolution (for instance), the choice of bounds puts the dynamic range of the actual instrument resolution in the range [0.2, 0.85], and the choice of bounds for intensity puts its dynamic range as [0.1, 0.95]. Since two resolutions will have differences no greater than 0.65 but two intensities will have differences as great as 0.85, the intensity dimension will inadvertently be weighted higher than the resolution if they are combined into one fitness score, either through addition or multiplication, for example. This can make the objective function arbitrary in its treatment of its dimensions.

An alternative approach to evaluating multi-objective functions is by performing a Pareto optimization. Here, actual values do not matter, only their rank in each dimension. When this is done, instead of arriving at a single optimum, a whole "frontier" of optima is formed, consisting of all points that are non-dominated. A point is non-dominated if there is no other point that is higher ranked in all dimensions. This is an effective way to find a final set of points that are optimal, but to pick a single optimum, one must still use other criteria. This requires a weighting or normalization of dimensions. In this case, the settings that increase the value of one outcome may decrease the value of another outcome, making the calculation of a single optimum non-trivial.

In order to overcome the issues with the above approaches, a technique called histogram equalization may be applied for the objectives. This allows the problem to be solved with a probabilistic approach.

The first step is to generate an experimental histogram representing the distribution of objective values in the domain. Table 1 shows an example of parameters used to generate such a histogram using a grid search along the three instrument settings of interest within bounds defined by subject matter experts:

TABLE 1

The grid search parameters used to generate the experimental histogram.

|  | Minimum | Maximum | Step size |
| --- | --- | --- | --- |
| Reflectron grid voltage | 1.581 | 1.601 | 0.002 |
| Steering voltage | −0.6 | 1.4 | 0.2 |
| Pusher offset voltage | −0.7 | 1.3 | 0.2 |

Since the grid is uniform, running it through the instrument produces a grid of outcomes-resolutions and intensities—that approximate a probability distribution, P[r,s], marginalized over all states of settings, for each resolution, r, and sensitivity, s. This experimental probability distribution is integrated to its cumulative distribution function (CDF) and then divided by the maximum value to produce values in the range [0,1]. These are used to weight or normalize the resolution and intensity to the same scale.

In the CMA runs, when an individual is evaluated, the sensitivity and resolution from the averaged scans are evaluated per these CDFs and the CDF value is used as the fitness score (as shown in FIG. 5A-FIG. 5D). For example, if there are two settings that produce resolutions at 4,000 and 4,500, where the CDF is steep, then their scores will differ by a larger amount, which stems from the fact that there are many settings with resolutions in that range (so a difference of 5,000 matters). On the other hand, if two settings produced resolutions of 10,500 and 11,000, near the far right of the CDF, their scores will be very similar because they exist at the edge of the range of possible resolutions for an instrument. In other words, anywhere in this range is considered a good resolution and further increases are not of large additional value.

With the sensitivity and resolution normalized this way, they can be combined. Resolution and intensity in mass spectra are correlated in certain parts of the search space (e.g. along the Pareto frontier) but can be approximated as independent without a statistically significant difference in result (as shown, e.g., in Equation 2)

$$\int_{-\infty}^{x_r,x_s} P[r,s] dr ds \approx \int_{-\infty}^{x_r} P[r] dr \int_{-\infty}^{x_s} P[s] ds \quad \text{Equation 2}$$

Next, the CDF was smoothed with a Gaussian kernel density estimator, with covariance matrix factor of 0.2 to smooth out instrument error from the grid search. This ensures that the change in fitness score for any two outcomes that are close in value is not discontinuous or noisy.

For each r (and similarly for each s):

$$f_{cdf}(x) = \int_{-\infty}^{x} P[r] dr \quad \text{Equation 3}$$

$$f_{smooth}(x) = \frac{1}{n}\sum_{i=1}^{n} N\left(\frac{f_{cdf}(x) - f_{cdf}(x_i)}{h}\right) \quad \text{Equation 4}$$

Where h, the bandwidth, is 0.2, N is the standard normal distribution, and n is the number of points.

There is a further dimension to the objective function, the peak shape. The objective is to find settings that minimize the tails of the leu enk peak. To do this, the peak is normalized to integrate to 1 and centered at 0 then fitted to a Pearson IV function using a least squares regression. The Pearson IV is similar to a Student's T distribution but with an extra parameter for asymmetry. The tails, defined as being a certain distance from the mean on the mass spectrum, are integrated as in Equation 5:

$$w = 0.5 \cdot (\int_{-\infty}^{-m_d} f_{pearson}(m) dm) + 0.5 \cdot (1 - \int_{-\infty}^{m_d} f_{pearson}(m) dm) \quad \text{Equation 5}$$

where $m_d$ is the value of the parameter that defines the size of the tails. If the average value of the two tail integrals is high, then those settings are scored low, if they are low, the settings are scored high. This heuristic is implemented by modeling the fitness score of the peak shape dimension as a reverse sigmoid as shown in Equation 6:

$$f_{peakShape}(v) = 1 - \frac{1}{1 + e^{-v}} \quad \text{Equation 6}$$

Where $$v = 100 \cdot (w - 0.04) \quad \text{Equation 7}$$

Figure 6:
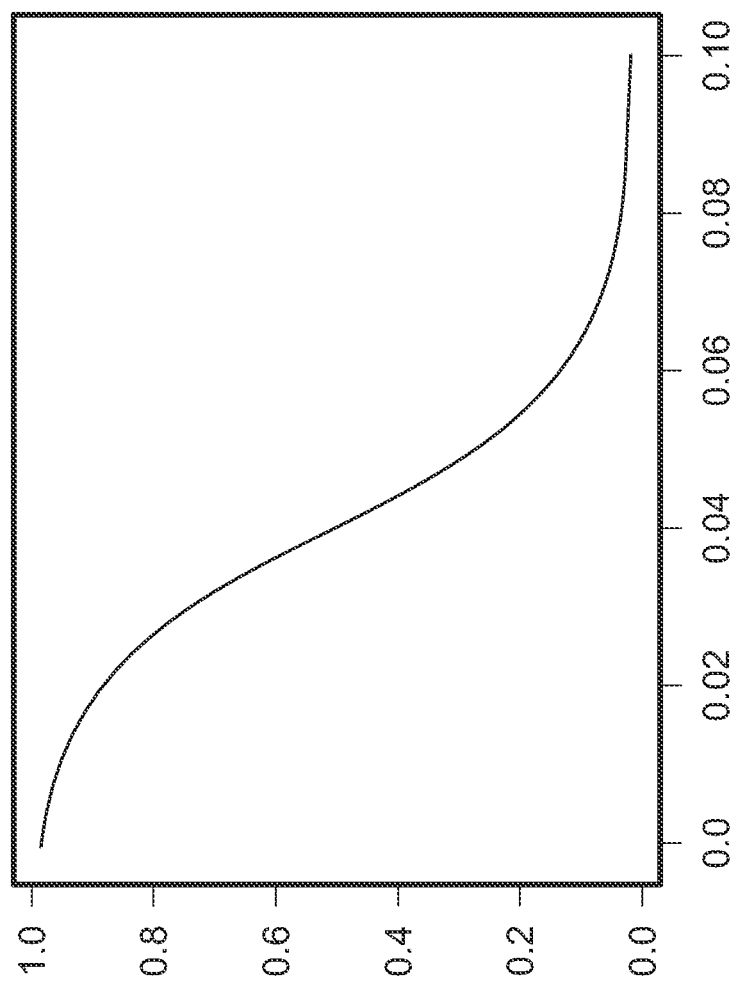
FIG. 6 illustrates an example of a utility function defining a fitness value of a peak shape in accordance with one embodiment.

This produces the values depicted in the graph of FIG. 6. This is a utility function rather than a probability, but it does produce values in the range [0,1]. A final fitness score is calculated according to Equation 8:

$$f_{fitness}(x_r, x_s, x_p) = P[x_r] P[x_s] f_p(x_p) \quad \text{Equation 8}$$

This defines the objective function.

In order to normalize the settings to one another (since, for example, the dynamic range of reflectron grid voltage was 2 orders of magnitude smaller than that of the steering or pusher offset voltages), the max and min values for each setting may be used to scale the value to the range 0-10. The search algorithm may operate at this scale. Once a new generation of offspring is sampled at this scale, the values may be scaled back to their original dynamic range and then sent to the instrument for evaluation. When the outcomes are returned and evaluated, the artificial scaling may be used to generate the vectors for the CMA update step.

In defining the hyperparameters for the CMA algorithm in tests of the embodiments described, exemplary embodiments of the meta-optimization produced values for the population size (λ), the survival size (μ), and the initial standard deviation (ν) of λ=8, μ=3, and σ=2.0.

In the model runs, the number of generations was set to 50, as this was an upper bound for convergent behavior in test runs. Then a convergence criterion was developed as follows. The instrument was set to its default settings and 10 data points of intensity and resolution were obtained in succession from which fitness values were calculated. The standard deviation of these fitness scores are considered a representation of instrument noise as this is the variability in the signal without modifying the settings or any other inputs. During each generation of the running of the optimization algorithm, the fitness value of the best individual in that generation was stored. The algorithm was considered converged when the standard deviation of the last 10 maximum scores was less than the calculated instrument noise.

Artificial intelligence/machine learning (AI/ML) may be applied when searching the search space at FIG. 3(A). To that end, FIG. 7 depicts an AI/ML environment 700 suitable for use with exemplary embodiments. The operation of the AI/ML environment 700 will be described in more detail in FIG. 8 and FIG. 9.

The AI/ML environment 700 may include an AI/ML System 702, such as a computing device that applies an AI/ML algorithm configured to search a search space values for the parameters predicted to reduce data variability.

The AI/ML System 702 may make use of experimental data 708, which may originate with an experimental instrument. In some cases, the experimental data 708 may include pre-existing experimental data from databases, libraries, repositories, etc. The experimental data 708 may include an identification of a configuration of an MS apparatus (e.g., specifying values for the parameters for the adjustable parts of the MS apparatus), as well as measurements indicative of data variability when an experiment is run on the MS apparatus suing the parameters. The experimental data 708 may be collocated with the AI/ML System 702 (e.g., stored in a Storage 710 of the AI/ML System 702), may be remote from the AI/ML System 702 and accessed via a Network Interface 704, or may be a combination of local and remote data. In the Training Data 712, the experimental data returned from experimental apparatuses may be supplemented by data learned by modeling and simulation in software, and by parsing scientific and academic literature for information about the relationships.

As noted above, the AI/ML System 702 may include a Storage 710, which may include a hard drive, solid state storage, and/or random access memory. The storage may hold Training Data 712, which may compare different test results to identify a configuration of the MS device used to generate the Training Data 712 (e.g., parameter value(s) 714) and measurements of the data that resulted from these settings. In one example, these measurements may include the reproducibility 716 and/or the stability 718 of the data, the data resolution 720, the data intensity 722, and/or the peak shape 724, although other properties may be measured depending on the application.

The Training Data 712 may be applied to train an AI model 730. Depending on the particular application, different types of AI model 730 may be suitable for use. For instance, in one embodiment, the AI model 730 may represent a population for an evolutionary algorithm such as a genetic algorithm. Each member of the population may be represented as a possible configuration of the MS apparatus, and members of the population may reproduce according to reproduction rules to create new offspring. The new offspring may represent a mix of the parameter settings of each parent member, with the possibility of additional changes specified by mutation rules. At each stage of evolution, the "best" population members (e.g., the ones most likely to reduce data variability) may be selected for further reproduction, until a final population member is selected as a candidate to configure the MS apparatus.

The present invention is not limited to use with evolutionary algorithms; any suitable AI Algorithm 726 may be used. Examples of other AI constructs that are suitable for use with the embodiments described herein include Markov decision processes, Bayesian optimization, and reinforcement learning. Other types of AI constructs may be used, depending on the designer's goals, the resources available, the amount of input data available, etc. The specific AI Algorithm 726 and AI model 730 used depends on the AI construct selected. For instance, in a reinforcement learning scenario, the MS apparatus configuration may be adjusted by the AI model 730 in real-time, and evaluated by another model that simulates the effect of the configuration on data variability (or an actual experiment may be conducted to glean this information). The AI/ML System 702 may attempt to minimize data variability through iterations of the AI Algorithm 726.

The AI Algorithm 726 may be applied using a Processor Circuit 706, which may include suitable hardware processing resources that operate on the logic and structures in the Storage 710. The AI Algorithm 726 and/or the development of the trained AI model 730 may be at least partially dependent on model Hyperparameters 728; in exemplary embodiments, the Hyperparameters 728 may be automatically selected based on Hyperparameter Optimization logic 736, which may include any known hyperparameter optimization techniques as appropriate to the AI model 730 selected and the AI Algorithm 726 to be used. The Hyperparameters 728 used may depend on the type of AI construct selected; for example, in an evolutionary algorithm, the Hyperparameters 728 may include the reproduction rules, mutation rules, population size, scoring mechanics for determining which population members survive into the next round of evolution, etc.

Optionally, the AI model 730 may be re-trained over time, in order to accommodate new knowledge about MS apparatus configurations and new experiments performed.

In some embodiments, some of the Training Data 712 may be used to initially train the AI model 730, and some may be held back as a validation subset. The portion of the Training Data 712 not including the validation subset may be used to train the AI model 730, whereas the validation subset may be held back and used to test the trained AI model 730 to verify that the AI model 730 is able to generalize its predictions to new data.

Once the AI model 730 is trained, it may be applied (by the Processor Circuit 706) to new input data. The new input data may include current MS apparatus configuration problems. This input to the AI model 730 may be formatted according to a predefined input structure 732 mirroring the way that the Training Data 712 was provided to the AI model 730. The AI model 730 may generate an output structure 734 which may be, for example, a selection of parameter values predicted to reduce data variability when used to run an experiment. The output structure 734 may be provided to the MS apparatus as a recommended configuration.

The above description pertains to particular kinds of AI/ML System 702. However, the present invention is not limited to use with a specific AI/ML paradigm, and other types of AI/ML techniques may be used.

Figure 8:
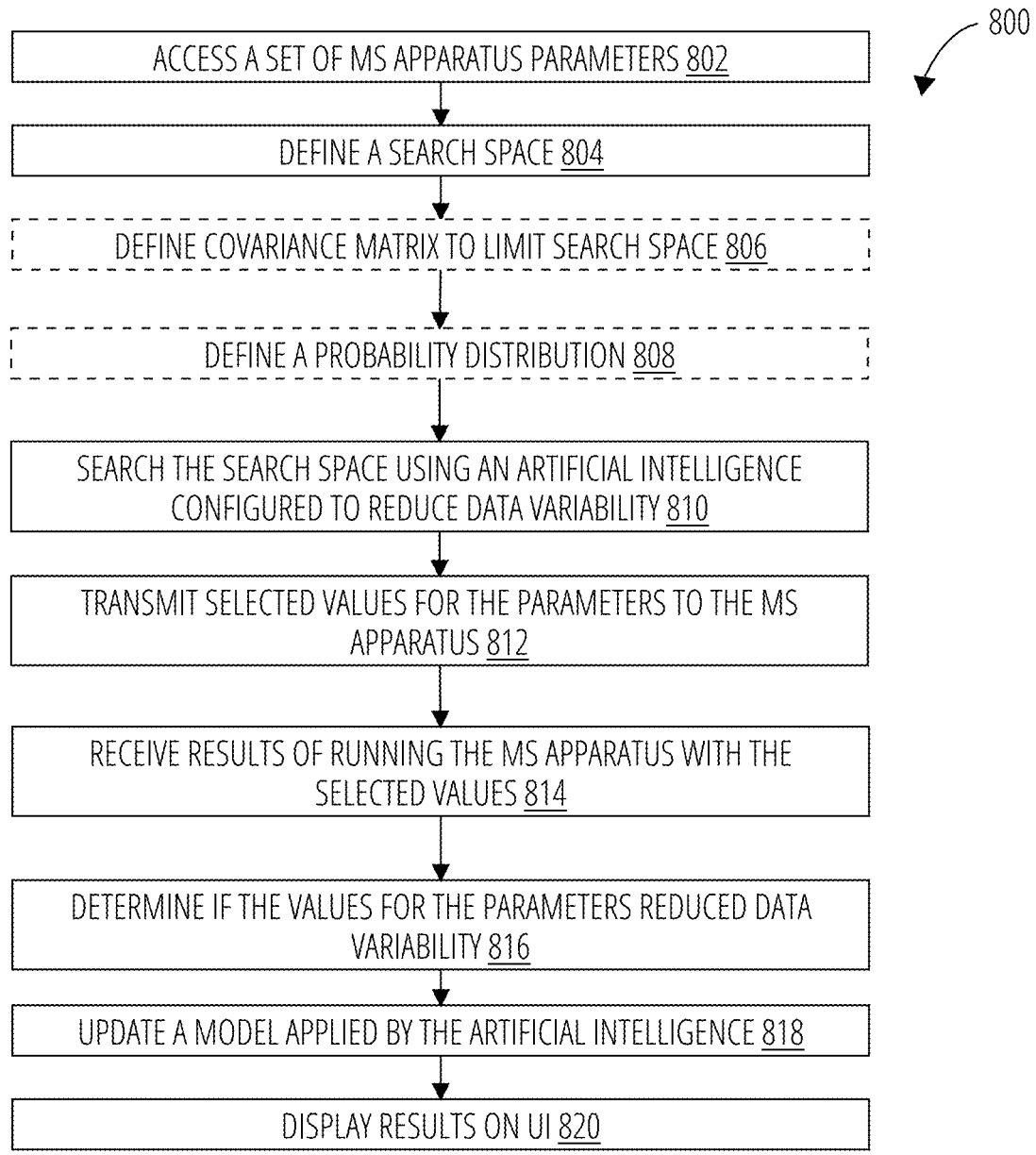
FIG. 8 illustrates a tuning routine 800 in accordance with one embodiment.

FIG. 8 depicts an exemplary tuning routine 800 in accordance with an exemplary embodiment.

In block 802, tuning routine 800 accesses a set of parameters. Each parameter may be associated with a part of a mass spectrometry (MS) apparatus and may control an operation of the part during a data gathering process. The set of parameters may be stored on the tuning device 128 and/or may be retrieved from the MS apparatus itself or from technical specifications stored on a third party device.

In block 804, the tuning device 128 may define a search space based on the set of parameters. The search space may be an N-dimensional space, where N is an integer corresponding to the number of parameters. Each parameter may take on a value, and each value may be represented in the search space. Thus (for example), if the first parameter can take any value from 0 to a, the second parameter can take any value from 0 to b, ..., and the Nth parameter can take any value from 0 to n, the search space may have a size of a×b× ... ×n. A particular configuration representing a single point in the search space may be specified as a set $\{value_1, value_2, \ldots, value_N\}$.

In block 806, the tuning device 128 may optionally define a covariance matrix to limit the search space. The covariance matrix may be a data structure in the form of a matrix (or other suitable structure) that defines relationships between parameters. These relationships may be captured as covariance relationships, mathematical equations, formulas, corresponding ranges of acceptable values, etc. The covariance matrix may be built using experimental data, models, expert opinion, academic research, etc.

In block 808, the tuning device 128 may optionally define probability distributions for the parameters. The probability distributions may represent relationships between values for a parameter and a probability that the value reduces data variability (or achieves some other goal, such as increasing performance, resolution, intensity, etc.) when the MS apparatus is used to conduct an experiment.

In some embodiments, the covariance matrix and probability distributions may be general-purpose constructs that are configured to be accurate for a wide range of applications. In others, the covariance matrix and probability distributions may be application specific (e.g., specific to a particular type of sample being studied or to a particular device). When these constructs are specific to a particular type of sample, it may allow the MS apparatus to be tuned on a sample-by-sample basis, resulting in better performance and/or reduced variability for each sample tested. When they are specific to a particular device, the tuning device 128 can combine probability distributions associated with a group of devices so as to attempt to minimize data variability across the group. This might entail reducing the performance of one or more of the MS apparatuses in order to bring their performance in line with other MS apparatuses in the group.

In some cases, the model/heuristic and/or probability distribution for a particular device may be defined, not in terms of the likelihood of reducing data variability on a particular device, but in terms of bringing the data variability performance characteristics of the device in line with other devices in a defined group. Thus, for example, the probability assigned to a parameter value for a particular device may not necessarily represent the probability that a configuration including the value when applied to the device, as an individual, would result in a minimal data variability, but rather the probability that the configuration would bring the data variability of the device closer to the performance of other devices in the group. This can be achieved by testing a parameter configuration on a first device testing a sample and a parameter configuration on a second device testing the same sample, and penalizing the configurations if the devices give different results (or, in the alternative, reinforcing the configurations when the devices give the same results).

Figure 9:
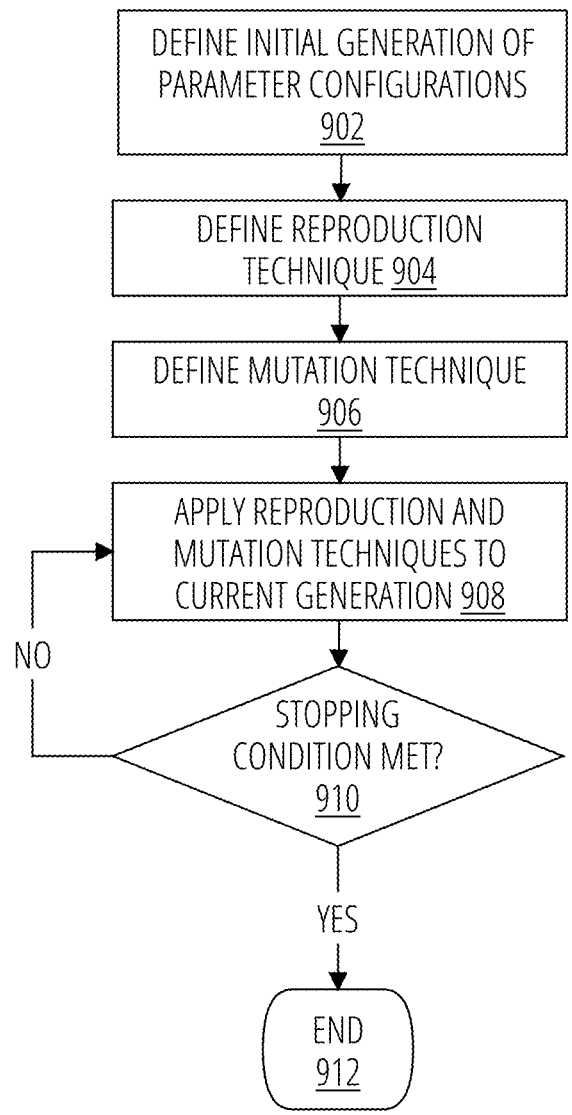
FIG. 9 illustrates an exemplary evolutionary algorithm suitable for use with an exemplary embodiment.

In block 810, the tuning device 128 may search the search space using an artificial intelligence configured to select a set of values for the parameters that are predicted to reduce data variability during the data gathering process. The artificial intelligence may make use of the model/heuristic from block 806 and/or the probability distributions of block 808, if available. FIG. 9 provides a particular example of using the probability distributions and the model/heuristic in connection with an evolutionary artificial intelligence algorithm, although other types of artificial intelligence algorithms are also well-suited to searching the search space, as discussed above.

In some embodiments, the search space may be searched with the goal of reducing data variability across a group of instruments. The artificial intelligence may apply probability distributions and/or covariance matrices particular to each device from the group and/or a collective probability distribution/model/heuristic. When updating the model in block 818, below, the system may penalize/reinforce configurations determined to yield different/the same results when testing the same sample.

In block 812, the tuning device 128 may transmit the selected values for the parameters to the MS apparatus. In some embodiments, the tuning device 128 may configure the MS apparatus with the configuration by setting the parameter values directly, while in others the tuning device 128 may output a configuration data structure or file. The configuration data structure or file may be sent to the MS apparatus, which may configure itself, to a third party device that configures the MS apparatus, or to a user who manually configures the MS apparatus.

The MS apparatus may then run an analysis of a known sample using the configuration transmitted in block 812. In block 814, the tuning device 128 may receive results of running the MS apparatus with the selected values for the parameters (e.g., a spectrograph of the sample).

In block 816, the tuning device 128 may use the results (e.g., the spectrograph) to determine if the values for the parameters reduced data variability. This may be done, for example, by evaluating the reproducibility of the results (whether the MS apparatus was able to produce the same results in different contexts across multiple experimental runs) or the stability of the results (whether the results changed by more than a predetermined threshold amount when the MS apparatus changed the settings slightly, by less than a predetermined threshold amount). It may also be achieved by considering markers of data variability, such as peak shape, intensity, data resolution, and/or fragmentation efficiency. A candidate configuration may be assigned a score based on how much data variability was measured in the results using the above-noted factors.

In block 818, the tuning device 128 may updates a model applied by the artificial intelligence to select the set of values for the parameters based on the results from block 816. For example, if a given configuration resulted in relatively low data variability, then the probabilities associated with those values in the probability distributions may be increased. On the other hand, if the configuration resulted in relatively high data variability, then the probabilities associated with those values in the probability distributions may be decreased. In some cases, the amount of adjustment may be weighted based on the score assigned to the configuration in block 816 (so that a high score indicating low data variability causes the probability distribution to be shifted significantly towards the configuration values, a low score indicating high data variability causes the probability distribution to be shifted significantly away from the configuration values, and a score in between these extremes causes the probability distribution to be shifted in an appropriate direction but to a smaller degree.

In some embodiments, when two similar configurations yield significantly different results (e.g., by more than a predetermined threshold), it may be because some of the parameters that differed between the configurations are related to other parameters in a way not yet captured by the model/heuristic. Accordingly, the tuning device 128 may update the model/heuristic by constraining parameter groups to ranges that were used in configurations that did not yield significant data variability, while eliminating from consideration value combinations from configurations that did yield significant data variability.

In block 820, the tuning device 128 may display the results obtained at block 816 and/or block 818 on a user interface (UI). For example, when a particular parameter value or group of parameter values was determined to reduce data variability when set to a given range, the system may show these parameter values on the UI in order to provide insight to a user as to a configuration that the AI has determined to be productive. On the other hand, if a given parameter value or group of parameter values are determined not to work well (i.e., to increase data variability), then this information may also be presented so that the user can avoid applying such a configuration in the future.

FIG. 9 depicts exemplary logic for an evolutionary algorithm according to an exemplary embodiment. As noted above, an evolutionary algorithm is but one example of an AI Algorithm 726 suitable for use with exemplary embodiments; it is depicted here solely as an illustration of the techniques described herein.

In block 902, the tuning device 128 may define an initial generation of parameter configurations. Each parameter configuration may correspond to a member of a population for purposes of an evolutionary algorithm. Each member may include a value for each of the parameters, and for the initial generation the value for each of the parameters may be determined by sampling the probability distribution for that parameter. In one embodiment, the probability distribution may take the form of a bell curve, with the parameter values most likely to reduce data variability existing towards the center of the bell curve. One of ordinary skill in the art will understand that other types of probability distributions also exist, including exponential distributions, binomial distributions, Poisson distributions, etc. By selecting an appropriate standard deviation for the sampling, the tuning device 128 can adjust whether values are more likely to be selected from the area with the highest probability of reducing data variability (a relatively small standard deviation for an exploitation phase), or whether the values are distributed across a wider range of possibilities (a relatively large standard deviation, which allows the system to incorporate under-considered values and potentially locate surprise candidates in an exploration phase). As the system considers different configurations, it may update the probability distributions, allowing it to learn as it explores the parameters' search space.

When sampling the probability distribution for each parameter, the tuning device 128 may be constrained based on relationships captured in the model/heuristic. As values are selected for each parameter, the system may lock out values of other associated parameters by looking up the constraining parameter in the model/heuristic and filtering out options for constrained parameters that are not consistent with the relationships in the model/heuristic. Thus, the tuning device 128 may reduce the search space as values for parameters are determined.

In block 904, the tuning device 128 may define a recombination technique. This may involve retrieving a predetermined reproduction technique from storage, receiving a user-configured reproduction technique, or dynamically generating a reproduction technique using the Hyperparameter Optimization logic 736, among other possibilities. The reproduction technique may specify details such as how members of the population are selected and/or matched for reproduction (e.g., randomly, based on a fitness metric, etc.), how a resulting child member of the population inherits parameter values from its parent members (referred to as crossover or recombination). In the case of (e.g.) a genetic algorithm, the reproduction technique may specify that, as part of crossover, certain parameter values must be kept together as a group (the identities of these groupings of parameter values may be specified in the model/heuristic). Thus, when selecting combinations of parameter values that child can inherit, the reproduction technique may be constrained so that parameters known to cause increased data variability when they are altered independently are kept together in an acceptable range. In embodiments using a covariance matrix, the selection of new parameter values can be correlated without explicitly forcing parameter values into groupings.

In block 906, the tuning device 128 may define a mutation technique. This may involve retrieving a predetermined mutation technique from storage, receiving a user-configured mutation technique, or dynamically generating a mutation technique using the Hyperparameter Optimization logic 736, among other possibilities. In addition to inheriting parameter values from its parents, a child's parameter values may be allowed to change (e.g., randomly) in order to explore a wider range of solutions in the search space. The mutation technique may involve determining a new value for a parameter in a child member that differs from the parameter values of either of its parents, based on sampling the probability distribution of the parameter to generate a new value. In some embodiments, the mutation technique may be constrained in a similar way to the reproduction technique, so that certain parameters cannot be changed in isolation; they must either be changed as a group based on the relationships in the model/heuristic, or not changed at all. In some embodiments, individuals may be put through mutation only, without using recombination/reproduction.

In block 908, the tuning device 128 may apply the reproduction technique and the mutation technique to generate a new generation of child members of the population. In some embodiments, the parent members of the population may remain within the population, while in others some members of the population may be removed. In some embodiments, the values in the covariance matrix may be updated to follow the performance of the generation.

In decision block 910, the system determines if a predefined stopping condition is met. The stopping condition may be any suitable condition, such as when a certain amount of time has elapsed, when a certain number of generations have been created, or when a member of the population achieves a fitness score above a predetermined threshold (where the fitness score represents an estimate of how likely the configuration represented by the population member is to reduce data variability). If the decision at decision block 910 is "NO," then processing may return to block 908 and a further generation of population members may be generated. If the decision at decision block 910 is "YES," then the system may select one or more candidate configurations to be tested by the MS apparatus (e.g., the top m candidate configurations having a highest fitness score, all the candidate configurations in the population, a random sampling of candidate configurations, etc.). These candidate configurations may be returned by the algorithm. Processing may then proceed to block 912 and terminate.

Figure 10:
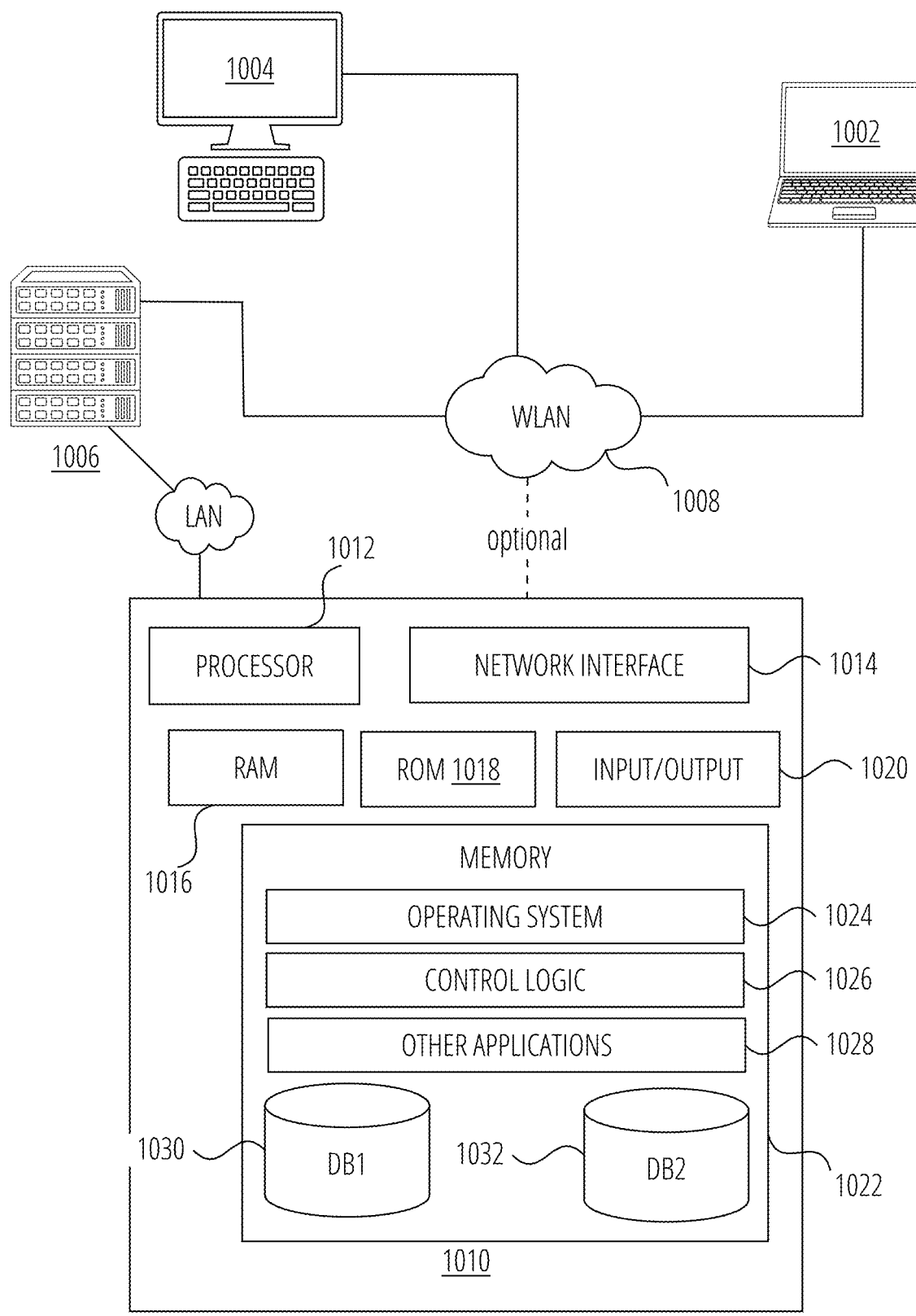
FIG. 10 depicts an illustrative computer system architecture that may be used to practice exemplary embodiments described herein.

FIG. 10 illustrates one example of a system architecture and data processing device that may be used to implement one or more illustrative aspects described herein in a stand-alone and/or networked environment. Various network nodes, such as the data server 1010, web server 1006, computer 1004, and laptop 1002 may be interconnected via a wide area network 1008 (WAN), such as the internet. Other networks may also or alternatively be used, including private intranets, corporate networks, LANs, metropolitan area networks (MANs) wireless networks, personal networks (PANs), and the like. Network 1008 is for illustration purposes and may be replaced with fewer or additional computer networks. A local area network (LAN) may have one or more of any known LAN topology and may use one or more of a variety of different protocols, such as ethernet. Devices data server 1010, web server 1006, computer 1004, laptop 1002 and other devices (not shown) may be connected to one or more of the networks via twisted pair wires, coaxial cable, fiber optics, radio waves or other communication media.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 1010, web server 1006, and client computer 1004, laptop 1002. Data server 1010 provides overall access, control and administration of databases and control software for performing one or more illustrative aspects described herein. Data server 1010 may be connected to web server 1006 through which users interact with and obtain data as requested. Alternatively, data server 1010 may act as a web server itself and be directly connected to the internet. Data server 1010 may be connected to web server 1006 through the network 1008 (e.g., the internet), via direct or indirect connection, or via some other network. Users may interact with the data server 1010 using remote computer 1004, laptop 1002, e.g., using a web browser to connect to the data server 1010 via one or more externally exposed web sites hosted by web server 1006. Client computer 1004, laptop 1002 may be used in concert with data server 1010 to access data stored therein, or may be used for other purposes. For example, from client computer 1004, a user may access web server 1006 using an internet browser, as is known in the art, or by executing a software application that communicates with web server 1006 and/or data server 1010 over a computer network (such as the internet).

Servers and applications may be combined on the same physical machines, and retain separate virtual or logical addresses, or may reside on separate physical machines. FIG. 10 illustrates just one example of a network architecture that may be used, and those of skill in the art will appreciate that the specific network architecture and data processing devices used may vary, and are secondary to the functionality that they provide, as further described herein. For example, services provided by web server 1006 and data server 1010 may be combined on a single server.

Each component data server 1010, web server 1006, computer 1004, laptop 1002 may be any type of known computer, server, or data processing device. Data server 1010, e.g., may include a processor 1012 controlling overall operation of the data server 1010. Data server 1010 may further include RAM 1016, ROM 1018, network interface 1014, input/output interfaces 1020 (e.g., keyboard, mouse, display, printer, etc.), and memory 1022. Input/output interfaces 1020 may include a variety of interface units and drives for reading, writing, displaying, and/or printing data or files. Memory 1022 may further store operating system software 1024 for controlling overall operation of the data server 1010, control logic 1026 for instructing data server 1010 to perform aspects described herein, and other application software 1028 providing secondary, support, and/or other functionality which may or may not be used in conjunction with aspects described herein. The control logic may also be referred to herein as the data server software control logic 1026. Functionality of the data server software may refer to operations or decisions made automatically based on rules coded into the control logic, made manually by a user providing input into the system, and/or a combination of automatic processing based on user input (e.g., queries, data updates, etc.).

Memory 1122 may also store data used in performance of one or more aspects described herein, including a first database 1032 and a second database 1030. In some embodiments, the first database may include the second database (e.g., as a separate table, report, etc.). That is, the information can be stored in a single database, or separated into different logical, virtual, or physical databases, depending on system design. Web server 1006, computer 1004, laptop 1002 may have similar or different architecture as described with respect to data server 1010. Those of skill in the art will appreciate that the functionality of data server 1010 (or web server 1006, computer 1004, laptop 1002) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting or markup language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method comprising:
accessing a set of parameters, each parameter associated with a part of a mass spectrometry (MS) apparatus and controlling an operation of the part during a data gathering process, the set of parameters collectively forming a search space;
searching the search space using an artificial intelligence configured to select a set of values for the parameters, wherein the artificial intelligence is configured to:
define a probability distribution for each parameter, the probability distribution describing a range of values for a respective parameter and a likelihood that a selected value optimizes a data variability during the data gathering process, and
sample values for the parameters based on the probability distribution;
transmitting the selected values for the parameters to the MS apparatus;
receiving results of running the MS apparatus with the selected values for the parameters;

based on the results, determining if the values for the parameters reduced data variability; and based on the determining, updating a model applied by the artificial intelligence to select the set of values for the parameters.

2. The computer-implemented method of claim 1, wherein the artificial intelligence is configured to select the values for the parameters based on one or more of:

reproducibility of the results, wherein an improved reproducibility is indicated when a same sample is analyzed to yield substantially similar results across different times, instruments, labs, or operators; or a stability of the results of running the MS apparatus, wherein an improved stability is indicated when a relatively small change to the set of parameters does not substantially reduce a quality of the results.

3. The computer-implemented method of claim 1, wherein the artificial intelligence is configured to select the values for the parameters:

based on one or more of a data resolution, a data intensity, or a peak shape in data from the MS apparatus; that are predicted to yield improved results across different samples; or based on a particular sample to be analyzed by the MS apparatus.

4. The computer-implemented method of claim 1, further comprising defining a covariance matrix configured to limit the search space based on relationships between the parameters.

5. The computer-implemented method of claim 1, wherein the MS apparatus is one of a plurality of MS apparatuses, and the MS apparatuses' parameters are tuned as a group to reduce data variability across the group.

6. The computer-implemented method of claim 1, wherein the artificial intelligence applies an evolutionary algorithm configured to:

define a first generation of parameter configurations;

define a reproduction technique among the parameter configurations;

define a mutation technique among the parameter configurations; and apply the reproduction technique and the mutation technique to create a second generation of parameter configurations.

7. The computer-implemented method of claim 6, wherein applying the reproduction technique comprises determining two or more of the parameters that are related to each other, and swapping the related parameters as a group.

8. The computer-implemented method of claim 1, wherein the artificial intelligence applies one or more of: Bayesian optimization, reinforcement learning, or a covariance matrix adaptation (CMA) algorithm.

9. A non-transitory computer-readable storage medium, the computer-readable storage medium including instructions that when executed by a computer, cause the computer to:

access a set of parameters, each parameter associated with a part of a mass spectrometry (MS) apparatus and controlling an operation of the part during a data gathering process, the set of parameters collectively forming a search space;

search the search space using an artificial intelligence configured to select a set of values for the parameters, wherein the artificial intelligence is configured to:

define a probability distribution for each parameter, the probability distribution describing a range of values for a respective parameter and a likelihood that a selected value optimizes a data variability during the data gathering process, and sample values for the parameters based on the probability distribution;transmit the selected values for the parameters to the MS apparatus;

receive results of running the MS apparatus with the selected values for the parameters;

based on the results, determining if the values for the parameters reduced data variability; and based on the determining, update a model applied by the artificial intelligence to select the set of values for the parameters.

10. The computer-readable storage medium of claim 9, wherein the artificial intelligence is configured to select the values for the parameters based on one or more of:

reproducibility of the results, wherein an improved reproducibility is indicated when a same sample is analyzed to yield substantially similar results across different times, instruments, labs, or operators; or a stability of the results of running the MS apparatus, wherein an improved stability is indicated when a relatively small change to the set of parameters does not substantially reduce a quality of the results.

11. The computer-readable storage medium of claim 9, wherein the artificial intelligence is configured to select the values for the parameters:

based on one or more of a data resolution, a data intensity, or a peak shape in data from the MS apparatus; that are predicted to yield improved results across different samples; or based on a particular sample to be analyzed by the MS apparatus.

12. The computer-readable storage medium of claim 9, wherein the instructions further configure the computer to define a covariance matrix configured to limit the search space based on relationships between the parameters.

13. The computer-readable storage medium of claim 9, wherein the MS apparatus is one of a plurality of MS apparatuses, and the MS apparatuses' parameters are tuned as a group to reduce data variability across the group.

14. A computing apparatus comprising:

a processor; and a memory storing instructions that, when executed by the processor, configure the apparatus to:

access a set of parameters, each parameter associated with a part of a mass spectrometry (MS) apparatus and controlling an operation of the part during a data gathering process, the set of parameters collectively forming a search space;

search the search space using an artificial intelligence configured to select a set of values for the parameters, wherein the artificial intelligence is configured to:

define a probability distribution for each parameter, the probability distribution describing a range of values for a respective parameter and a likelihood that a selected value optimizes a data variability during the data gathering process, and sample values for the parameters based on the probability distribution;

transmit the selected values for the parameters to the MS apparatus;

receive results of running the MS apparatus with the selected values for the parameters;

based on the results, determining if the values for the parameters reduced data variability; and based on the determining, update a model applied by the artificial intelligence to select the set of values for the parameters.

15. The computing apparatus of claim 14, wherein the artificial intelligence is configured to select the values for the parameters based on one or more of:
- reproducibility of the results, wherein an improved reproducibility is indicated when a same sample is analyzed to yield substantially similar results across different times, instruments, labs, or operators; or
- a stability of the results of running the MS apparatus, wherein an improved stability is indicated when a relatively small change to the set of parameters does not substantially reduce a quality of the results.

16. The computing apparatus of claim 14, wherein the artificial intelligence is configured to select values for the parameters that are predicted to yield improved results across different samples.

17. The computing apparatus of claim 14, wherein the instructions further configure the apparatus to define a covariance matrix configured to limit the search space based on relationships between the parameters.

18. The computing apparatus of claim 14, wherein the MS apparatus is one of a plurality of MS apparatuses, and the MS apparatuses' parameters are tuned as a group to reduce data variability across the group.

* * * * *